United States Patent [19]
Watanabe

[11] Patent Number: 6,035,165
[45] Date of Patent: Mar. 7, 2000

[54] HIGH RESOLUTION LIQUID DEVELOPMENT IMAGE FORMING APPARATUS

[75] Inventor: Mitsuyoshi Watanabe, Inazawa, Japan

[73] Assignee: Brother Kogyo Kabushiki Kaisha, Nagoya, Japan

[21] Appl. No.: 09/139,018

[22] Filed: Aug. 24, 1998

[30] Foreign Application Priority Data

Aug. 29, 1997 [JP] Japan .................................. 9-234258

[51] Int. Cl.$^7$ .................................................. G03G 15/10
[52] U.S. Cl. ............................................ 399/239; 399/237
[58] Field of Search .................................... 399/233, 237, 399/239; 430/117, 118

[56] References Cited

U.S. PATENT DOCUMENTS

| 3,096,198 | 7/1963 | Schaffert ............................. 399/239 X |
| 3,570,456 | 3/1971 | Marlor et al. ............................ 399/237 |
| 3,830,199 | 8/1974 | Saito et al. . |
| 3,973,955 | 8/1976 | Ohno et al. ......................... 399/237 X |
| 3,974,554 | 8/1976 | Fantuzzo ............................. 399/239 X |
| 3,978,817 | 9/1976 | Hauser et al. ......................... 399/239 |
| 4,043,657 | 8/1977 | Karnik ................................. 399/239 |
| 4,050,804 | 9/1977 | Silverberg ........................... 399/239 X |
| 4,258,115 | 3/1981 | Magome et al. .................... 430/117 X |
| 4,493,550 | 1/1985 | Takekida . |
| 4,990,962 | 2/1991 | Kishi .................................... 399/233 |
| 5,424,813 | 6/1995 | Schlueter, Jr. et al. ............... 399/239 |

FOREIGN PATENT DOCUMENTS

| B2-52-6091 | 2/1977 | Japan . |
| 62-5282 | 1/1987 | Japan . |
| B2-1-20740 | 4/1989 | Japan . |
| B2-1-40985 | 9/1989 | Japan . |

Primary Examiner—Susan S. Y. Lee
Attorney, Agent, or Firm—Oliff & Berridge, PLC

[57] ABSTRACT

An image forming apparatus includes a developer retainer 3 with a larger number of fine holes for holding liquid developer 30 obtained by dissolving or dispersing a coloring component such as dye and pigment in liquid, a developer supplier which supplies the developer to the fine holes, and a photosensitive drum 2 on which an electrostatic latent image can be formed. The roller-like retainer 3 made of a metallic mesh and the drum 2 are rotated while contacting each other. A doctor blade 6 scrapes away excess developer from a surface of the retainer 3 so that only the fine holes of the retainer 3 hold the developer 30 with its level positioned inside of the retainer from the surface thereof. The developer 30 is attracted by an electrostatic force exerted on the liquid developer by an electrostatic latent image formed on the drum 2.

27 Claims, 7 Drawing Sheets

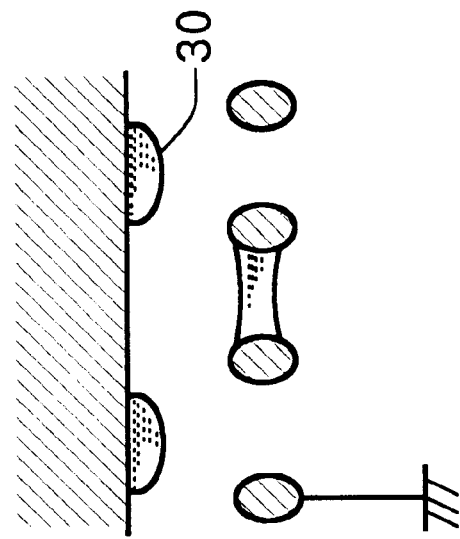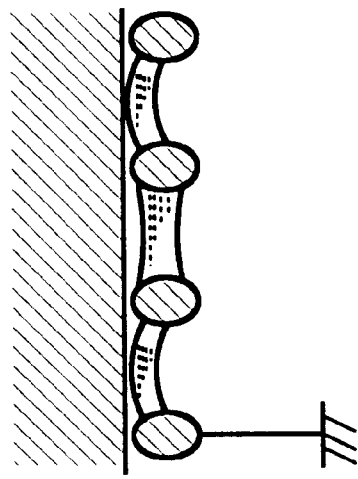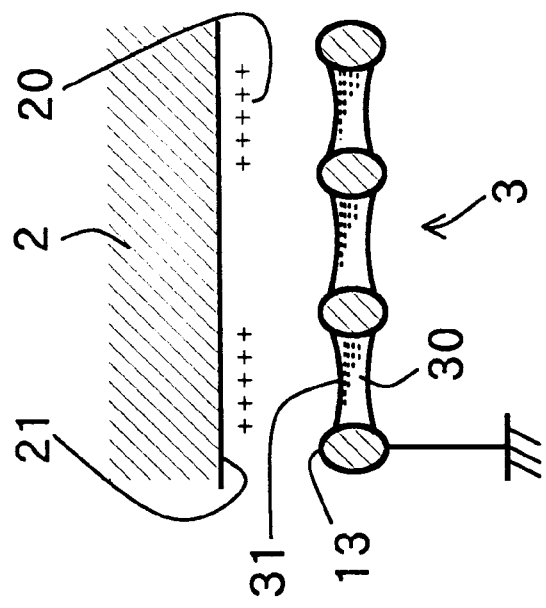

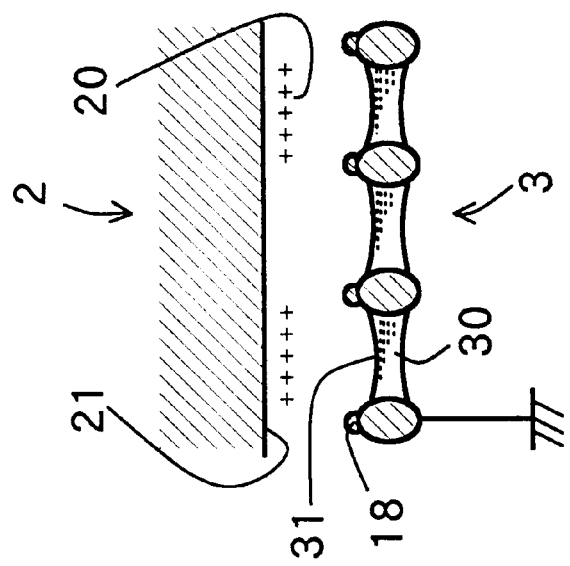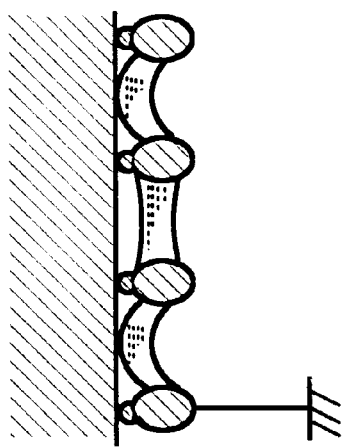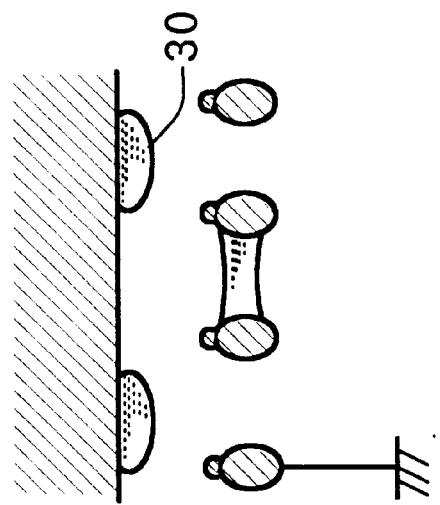

HIGH RESOLUTION LIQUID DEVELOPMENT IMAGE FORMING APPARATUS

BACKGROUND OF THE INVENTION

1. Field of the Invention

The present invention relates to an image forming apparatus which develops image of high-definition with liquid developer.

2. Description of Related Art

Heretofore, image forming apparatus using liquid developer generally use the method of causing electrical migration of toner fine particles which are dispersed in an insulating liquid carrier such as aliphatic saturated hydrocarbon and the like, so that the toner fine particles adhere to the surface of a dielectric body on which an electrostatic latent image is formed. This method enables the use of toner particles with smaller diameter than powder toner which is used in a developing device, and it is suitable for producing an image of a high resolution. There is also an advantage that liquid toner needs less energy for fixing than powder toner. However, aliphatic saturated hydrocarbon used as liquid carrier generates a disagreeable smell, which is unsuitable for the use in offices and homes. On the other hand, an image forming apparatus using liquid developer with water as the main ingredient is proposed in Japanese patent publication No. Sho 52-6091, Hei 1-40985, and Japanese patent application laid-open No. Sho 62-5282 respectively. Such the image forming apparatus, using the aqueous liquid developer, can resolve the problem concerning smell and reduce the cost of developer material.

However, in the image forming apparatus described in Japanese patent publication No. Sho 52-6091, a developer retainer is formed with a spirally arranged groove which holds therein liquid developer, which will adhere to a sheet on which an electrostatic latent image is formed. In this apparatus, the resolution varies depending on the pitch of the spiral groove, so that a high-resolution can not be obtained. Specifically, the liquid developer, which selectively adheres to a latent image formed portion on a sheet, is held in the spiral groove, resulting in the difficulty in the separation of the liquid developer in the grooved direction and thus deteriorating the resolution in the grooved direction. The groove of the developer retainer is formed by a mechanical cutting process, which is hard to make a groove having a width of 0.1 mm or less. This sets a limit in the resolution in the direction of a groove width.

In the development apparatus described in the Japanese patent publication No. Hei 1-40985 and Japanese patent application laid-open No. Sho 62-5282, the developer retainer, or a sleeve with many fine bores for holding developer is placed close to an image bearing member (photosensitive drum) but without making contact therewith, and the liquid developer held in the sleeve is jumped up by the electrostatic force to the image bearing member, the latent image formed on the image bearing member is developed into a visual image. Since the electric field of the electrostatic latent image abruptly becomes flatter with distance from the surface of the image bearing member, the clearance between the image bearing member and the sleeve is required to be several tens μm or less. Such the minute clearance is difficult to be precisely maintained at a constant distance. Variation in the clearance distance will causes a change in the electrostatic force, resulting in a deterioration of image quality.

SUMMARY OF THE INVENTION

The present invention has been made in view of the above circumstances and has an object to overcome the above problems and to provide an image forming apparatus which can use an aqueous liquid developer to produce stable images of high resolution.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, according to a first embodiment of the present embodiment, there is provided an image forming apparatus for performing image formation including a developer retainer provided with a number of fine holes each of which holds liquid developer obtained by dissolving or dispersing a coloring component in liquid, a developer supplier for supplying the liquid developer to the fine holes of the developer retainer, a photosensitive member disposed in contact with a peripheral surface of the developer retainer, and a latent image forming device for forming an electrostatic latent image on a surface of the photosensitive member in accordance with predetermined image data, the liquid developer held in the developer retainer being made to selectively adhere to the electrostatic latent image formed on the surface of the photosensitive member by the latent image forming device to form a visual image, and the visual image corresponding to the latent image being transferred to a recording medium, the image forming apparatus further including a removing member for removing excess liquid developer from the developer retainer by moving relative to the surface thereof, and wherein the developer retainer, from which the excess developer is removed by the removing member, holds the liquid developer in each of the fine holes alone so that a level of the liquid developer is positioned inside of the fine hole, separately from a contact point at which the surface of the retainer comes into contact with the photosensitive member, by a surface tension of the liquid developer.

In the above image forming apparatus, the liquid developer held in the fine holes comes close to the surface of the photosensitive member with a constant clearance, whereby to selectively adhere to the electrostatic latent image formed on the surface of the photosensitive member, thus developing the latent image into a visual image. At this time, the liquid developer does not contact the area where no image is formed, enabling the formation of image of high-definition without contamination and fog. Since the image forming apparatus capable of using the aqueous liquid developer, not needing the use of insulating developer, it is desirable in view of environment.

According to a second embodiment of the present invention, there is provided an image forming apparatus for performing image formation including a developer retainer provided with a number of fine holes each of which holds liquid developer obtained by dissolving or dispersing a coloring component in liquid, a developer supplier for supplying the liquid developer to the fine holes of the developer retainer, a photosensitive member disposed in contact with a peripheral surface of the developer retainer, and a latent image forming device for forming an electrostatic latent image on a surface of the photosensitive member in accordance with predetermined image data, the liquid developer held in the developer retainer being made to selectively adhere to the electrostatic latent image formed on the surface of the photosensitive member by the latent image forming device to form a visual image, and the visual image corresponding to the latent image being transferred to a recording medium, wherein protrusions are formed around the fine holes formed in the developer retainer, and the protrusions when come into contact with the surface of the photosensitive member define a clearance between the surface of the photosensitive member and each level of the liquid developer retained in the fine holes at a constant distance.

In the above image forming apparatus, the liquid developer held in the fine holes comes close to the surface of the photosensitive member with a constant clearance which is defined by the protrusions formed on the developer retainer. Thus, the liquid developer can selectively adhere to the electrostatic latent image formed on the photosensitive member. At this time, the liquid developer does not contact the area where no image is formed, enabling the formation of image of high-definition without contamination and fog. Since the image forming apparatus capable of using the aqueous liquid developer, not needing the use of insulating developer, it is desirable in view of environment.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIG. 3($b$) is a cross sectional view of the developer retainer of FIG. 3($a$);

FIGS. 4($a$) to 4($c$) are explanatory sequential views of the principle of selective adhesion of liquid developer to a photosensitive drum in the first embodiment;

FIG. 5($b$) is a cross sectional view of the developer retainer of FIG. 5($a$);

FIGS. 6($a$) to 6($c$) are explanatory sequential views of the principle of selective adhesion of liquid developer to a drum in the second embodiment;

DETAILED DESCRIPTION OF THE PREFERRED EMBODIMENTS

A detailed description of preferred embodiments of an image forming apparatus embodying the present invention will now be given referring to the accompanying drawings.

Figure 1:
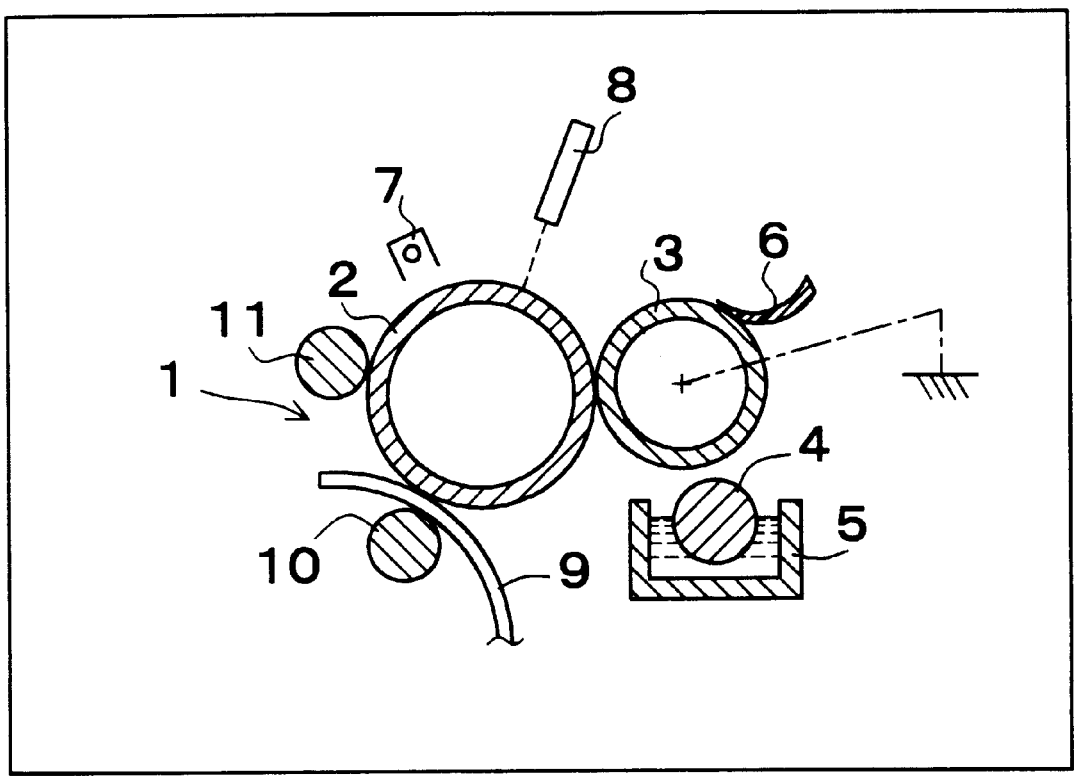
FIG. 1 is a structural view of an image forming apparatus in a first embodiment according to the present invention.

In FIG. 1, an image forming apparatus 1 is mainly provided with a photosensitive drum 2 which can bear thereon electrostatic latent images, a developer retainer 3 disposed opposite to the drum 2 so that the retainer 3 is rotated while contacting the surface of the drum 2, a developer supply roller 4 disposed so as to be rotatable while contacting the retainer 3 whereby to supply liquid developer thereto, a developer tank 5 which stores the liquid developer to be supplied to the roller 4, a remover 6 which removes excess liquid developer on the retainer 3 to adequately regulate an amount of the liquid developer on the retainer 3, a charging device 7 disposed near the drum 2 to uniformly electrically charge the surface of the drum 2, a selective exposure device 8 which selectively exposes the drum surface in accordance with image data, a transfer roller 10 which transfers the developer image formed on the drum surface onto a recording paper 9, and a clearing roller 11 which cleans the surface of the drum 2 to remove the remaining developer thereon.

In the image forming apparatus in the first embodiment, an aqueous solution can be used for liquid developer agent, which has an environmental advantage concerning smell or the like, or an industrial advantage concerning inexpensive material cost as compared with a conventional liquid developer agent containing aliphatic saturated hydrocarbon as a main ingredient.

Next, each component of the image forming apparatus in the first embodiment will be described.

As liquid developer for use in an image forming device of this embodiment, aqueous/conductive liquid obtained by dissolving or dispersing a coloring component such as dye and pigment in pure water can be used. About $10^8$ Ωcm or less is sufficient for the conductivity of the liquid developer.

Although the specification of the device does not limit the liquid developer to the aqueous one, the aqueous liquid developer is preferable in consideration of an environmental problem and a manufacturing cost. Moreover, the particle diameter of the pigment or the like as dispersant can be about 0.1 to 1 $\mu$m and thus is extremely smaller than that of general powder developer (which is made by grinding or the like and has a particle diameter of 6 to 10 $\mu$m). Since the liquid developer has the small particle diameter, this developer is preferable for a high-resolution image formation.

A photosensitive drum 2 needs to be made of a material which can retain an electrostatic latent image on its surface and has wettability to the liquid developer on its surface that is higher than the wettability of a developer retainer 3. However, if the wettability is too high, the deposit of the liquid developer causes the droplet of the liquid developer to be spread and thus the image is distorted. Therefore, the photosensitive drum 2 having the wettability of a contact angle of about 300°–80° is suitable. As the material of the photosensitive drum, an organic photoconductive material for a general use in a laser printer can be used.

Figure 2:
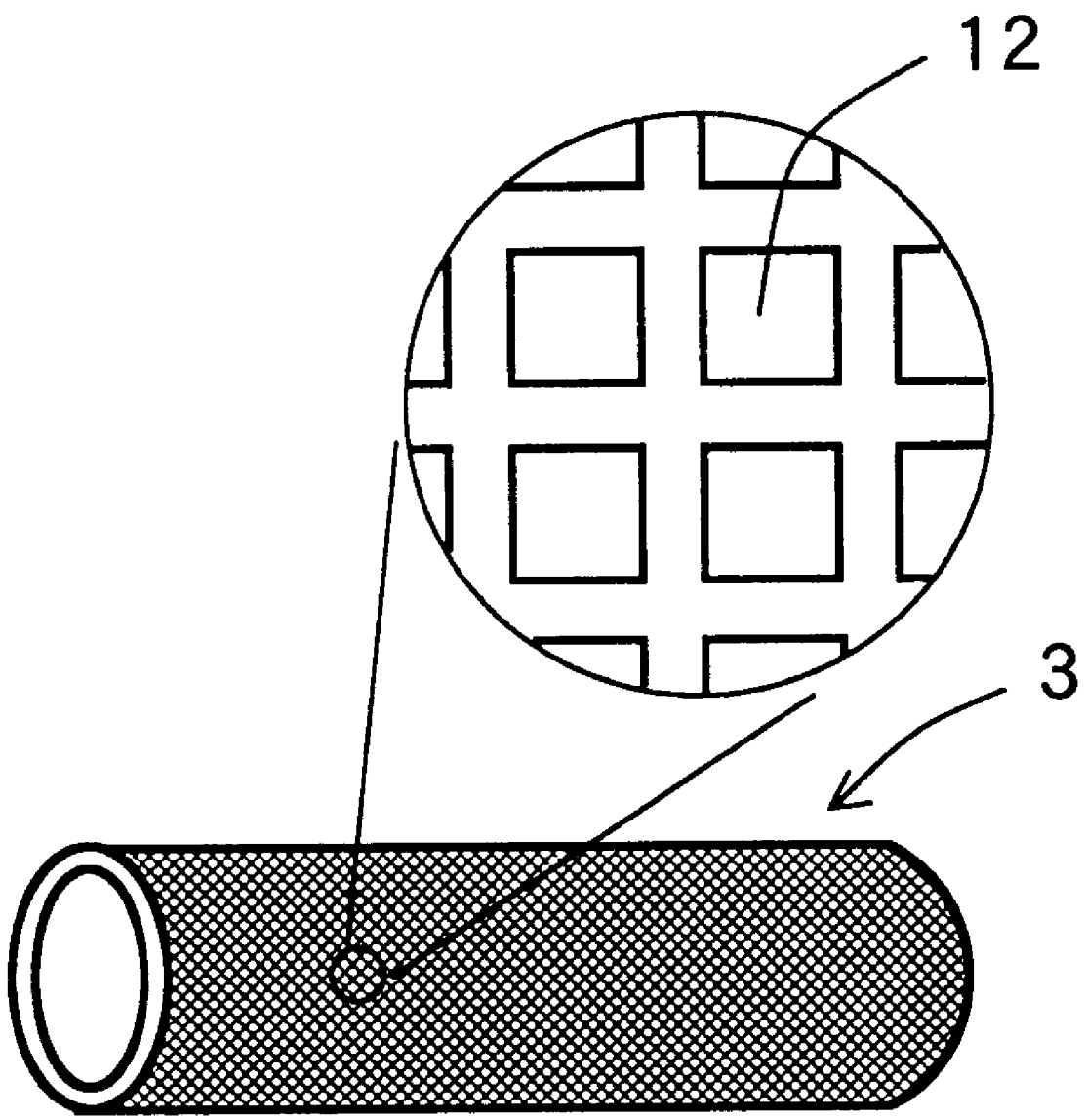
FIG. 2 is a schematic structural view of a developer retainer in the image forming apparatus.

The developer retainer 3 is installed in order to supply a suitable amount of the liquid developer to the surface of the photosensitive drum 2. As shown in FIG. 2, the developer retainer 3 is shaped like a roller in which many fine holes 12 are formed.

This developer retainer 3 can be formed by shaping a finely pitched mesh sheet into a roll, for example. The developer retainer 3 is not limited to a roller-shaped one but can be also a belt-shaped one, for example. As the mesh, the one for a highly fine screen print can be used. The mesh having 200 lines or more per 1 inch is thus suitable for the highly fine image formation.

Furthermore, since a metallic mesh manufactured by electroforming has no weave pattern and can be a uniform/highly-fine mesh of a high rate of opening, the metallic mesh is suitable for the formation of the developer retainer 3.

Such the electroforming to manufacture the fine mesh is scribed in detail in, for example, Japanese Patent publication No. Hei 1- 20740. As the material constituting this mesh, copper, nickel or the like is used. The electroforming allows the mesh of 2000 lines or more to be manufactured.

The developer retainer may be subjected to a calendar process to increase the flatness of mesh. The so calendared retainer, even if using a mesh made of a common resin, can stably hold liquid developer to be sufficiently separated from the fine holes of the mesh structure.

In the case of using the developer retainer 3 constituted of such a mesh, the liquid developer for forming one dot of image is retained in the fine holes 12 in the mesh. Accordingly, as the mesh is more finely pitched, the mesh can be used for the highly fine image formation. Also, the film thickness of the mesh is adjusted whereby an amount of the liquid developer per one dot can be adjusted. However, too thin a film thickness causes the durability of the mesh to be reduced, and thus the mesh is easily damaged. For this reason, the film thickness is required to be at least 10 μm or more in consideration of the handling of the mesh.

Figure 3:
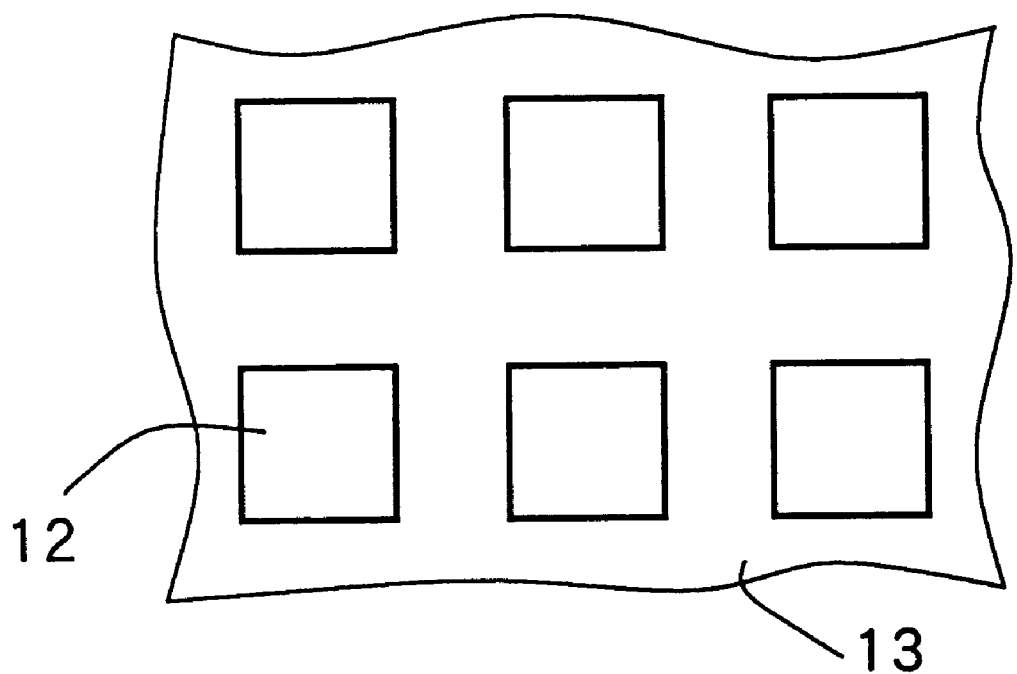
FIG. 3($a$) is an enlarged view of a part of the developer retainer to clearly show fine holes.
Figure 3:
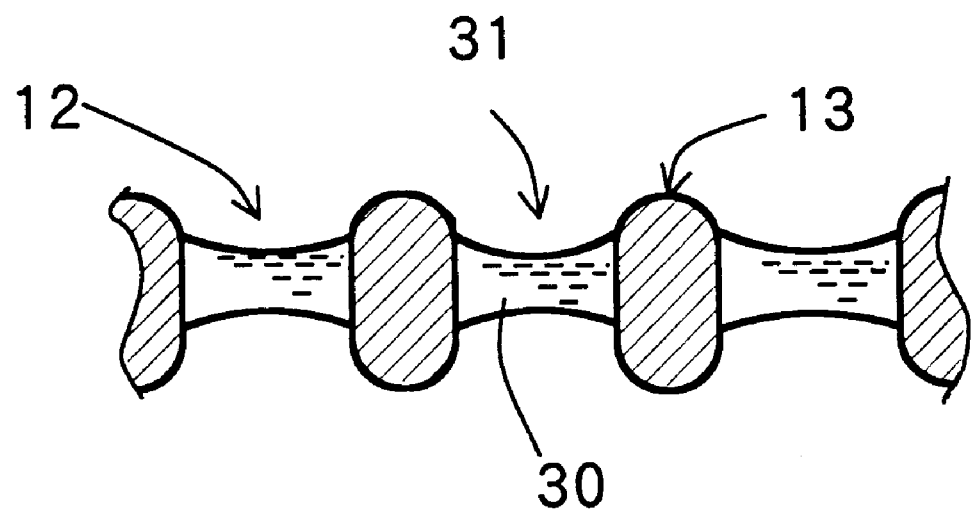

FIG. 3(a) shows an enlarged view of the fine holes 12 in which the liquid developer is retained and FIG. 3(b) shows a cross sectional view of FIG. 3(a). A level 31 of liquid developer 30 is located below the surface of the developer retainer 3 around the fine holes which is the uppermost point in FIG. 3(b) (i.e., the position apart from a contact point with the photosensitive drum). The liquid developer 30 is retained in such a manner that it does not adhere to the uppermost point of a surface 13 of the retainer 3.

The liquid developer is retained as described above for the following reason. That is, when the excess liquid developer is scraped away by a doctor blade, the liquid developer is removed from the surface (contact surface) of the developer retainer 3, so that the liquid developer is retained in the above-described fine holes alone. Therefore, a surface tension of the liquid developer allows the level to be separated from the above- mentioned surface (contact surface).

Additionally, the fine holes have a curved surface structure (inclined structure) which is shaped like such a horn that a hole diameter becomes larger as the hole is closer to the surface (contact surface) 13. Thus, the excess liquid developer near the surface 13 retained in the fine holes 12 can be easily removed. Moreover, the fine holes 12 have a tapered structure (inclined structure) in such a manner that the hole diameter becomes larger as the hole is closer to the surface 13, whereby the same effect can be also obtained. This occurs in the following manner. That is, the large hole diameter allows the doctor blade to be easily enter near the inside of the contact surface of the fine holes. In addition, an angle of the surface of the aforementioned inclined structure to the contact surface is less than 90°0 Therefore, the liquid developer is removed from the fine holes by the doctor blade in the form of large droplet along the surface of the inclined structure due to an action of its surface tension.

As a result, the level of the residual liquid developer in the holes is located inside of the developer retainer from the contact surface of the developer retainer 3 with the photosensitive drum, that is, the level is separated from the contact surface of the retainer 3 when brought into contact with the photosensitive drum. At this separated position, the surface of the photosensitive drum has no charge attracting the liquid developer.

Furthermore, the thinner the line width to the hole diameter is, the less the excess droplet adheres to the surface 13.

According to an experiment in the liquid developer of this embodiment, the rate of opening of 20% or more ensured a sufficient amount of liquid and also enabled the excess droplet to be removed.

The surface of the developer retainer 3 is allowed to be water-repellent, whereby the excess liquid developer can be easily removed. As means for making the surface water-repellent, a water-repellent plating such as a nickel fluorine plating is suitable because it can simply obtain the more stable repellent effect. The surface is coated with water-repellent resin such as silicone resin, whereby the water-repellency can be added to the surface.

The developer supply roller 4 is provided with a sponge roller, a portion of which is immersed in the liquid developer in the tank 5 so that the roller 4 is saturated with the liquid developer.

The developer tank 5 stores liquid developer to be supplied to the roller 4. This tank 5 is preferably made so as to be airtight except an opening through which the roller 4 is inserted in the tank 5.

The remover 6 is composed of a doctor blade disposed such that the blade slides on the periphery of the developer retainer 3 in rotating in order to remove excess liquid developer therefrom. This doctor blade is, for example, made of a silicone resin and the like.

The charging device 7 consists of, for example, a Scorotron charger which is used in a general laser printer. A charging potential of the charging device 7 can be set to about 400–600 V.

The selective exposure device 8 is provided with a photo-scanner consisting of a semiconductor laser and a polygon mirror, and others. The photo-scanner performs modulation in accordance with the image data while scanning the surface of the photosensitive drum 2 charged by the charging device 7, thereby to form an electrostatic latent image 30 on the drum surface.

The transfer roller 10 can consist of a rubber roller made of a silicone rubber, an urethane rubber, and the like. Alternatively, the transfer roller 10 may be made of one of those rubbers additionally including carbon to increase its electrical conductivity so that application of a bias voltage to the roller 10 prompts the transfer of the developed image formed on the drum 2 to the recording paper 9.

The cleaning roller 11 can be a sponge roller which has a good absorption of liquid developer.

The principle by which the liquid developer selectively adheres to the electrostatic latent image formed on the photosensitive drum 2 from the developer retainer 3 will be described below with reference to FIG. 4. As shown in FIG. 4(a), the liquid developer 30 is retained in the fine holes 12 of the grounded metallic mesh so that the level 31 may be located inside from the surface 13. When the photosensitive drum 2 and the developer retainer 3 are rotated, the distance between the liquid developer 30 retained in the fine holes 12 and an electrostatic latent image 20 formed on the photosensitive drum 2 is gradually reduced. As shown in FIG. 4(b), the surface 13 of the developer retainer 3 and a surface 21 of the photosensitive drum are brought into contact with each other. The distance between the developer 30 and the electrostatic latent image 20 is about a few micrometers when they are closest to each other. This distance is determined by the shape of the fine holes 12, the wettability of the liquid developer 30 to the fine holes 12, the adjustment of the doctor blade (the hardness of the doctor blade and the contact angle with the developer retainer 3 ) or the like. Variation in the fine holes and variation with time are small. The liquid developer 30 close to the area having the charge of the electrostatic latent image 20 is attracted by its electrostatic force. Then, the liquid developer 30 comes into contact with the surface 21 of the photosensitive drum 2.

The surface 21 of the photosensitive drum 2 is made of the more wettable material to the liquid developer 30 than the material of the fine holes 12. Thus, when the surface 13 of the developer retainer 3 is separated from the surface 21 of the photosensitive drum 2, the liquid developer 30 remains adhering to the photosensitive drum 2 as shown in FIG. 4(c). On the contrary, the liquid developer 30 close to the area having no charge is not influenced by the electrostatic force. The liquid developer 30 does not come into contact with the photosensitive drum 2 at all. Thus, the liquid developer 30 remains retained in the fine holes 12. Since the liquid developer 30 does not come into contact with the area where the image is not formed, contamination and fog do not easily occur. As can be seen from the above description, the liquid developer 30 retained in the fine holes 12 selectively adheres to the electrostatic latent image 20 and then allows the image to be formed on the photosensitive drum 2.

Next, the operation of the image forming apparatus 1 will be explained below.

The liquid developer used in the image forming apparatus 1 in the embodiment is constantly stored in the developer tank 5. The developer supply roller 4 is disposed such that a portion thereof is immersed in the liquid developer in the tank 5 so that the sponge portion is saturated with the liquid developer. As rotated while contacting the retainer 3, the roller 4 supplies the liquid developer to the fine holes 12 formed in the retainer 3. Subsequently, when the retainer 3 is rotated with its peripheral surface contacting the remover 6, the excess developer on the surface 13 of the retainer 3 is removed by the remover 6. Accordingly, the fine holes 12 hold only an adequate amount of the liquid developer 30.

On the other hand, the surface 21 of the photosensitive drum 2 is uniformly charged by the charging device 7. The drum 2 is then selectively exposed by the selective exposure device 8 to form an electrostatic latent image 20 on the surface 21.

When the drum 2 and the retainer 3 are rotated while contacting each other, as mentioned above, the liquid developer 30 selectively adheres to the electrostatic latent image 20. Thus, a developer image is formed on the drum 2. The recording paper 9 is fed by a feeding device not shown to a nip zone between the drum 2 and the transfer roller 10. At this nip zone, the developer image on the drum 2 is transferred to the recording paper 9 to form a final image thereon. The remaining liquid developer on the drum 2 is removed by the cleaning roller 11 to return the drum surface to an initial state. Repeating the sequence of operations described above, the image forming apparatus forms all of desired images on the recording paper 9 and fixes them through a fixing section. The paper 9 is then discharged out of the apparatus.

Next, a second embodiment according to the present invention will be explained below, referring to FIGS. 5(a) and 5 (b) and FIG. 6. Like elements in the second embodiment to those in the first embodiment are indicated by like numerals.

Similarly to the first embodiment, a level 31 of liquid developer 30 is held, as shown in FIG. 5(b), inside of a developer retainer 3 from a surface (contact surface) 13 thereof so that the liquid developer 30 does not adhere to the surface 13. The removal of the excess developer in the first embodiment is made by the remover 6 consisting of a doctor blade so that the liquid level is regulated to a proper level.

Figure 5:
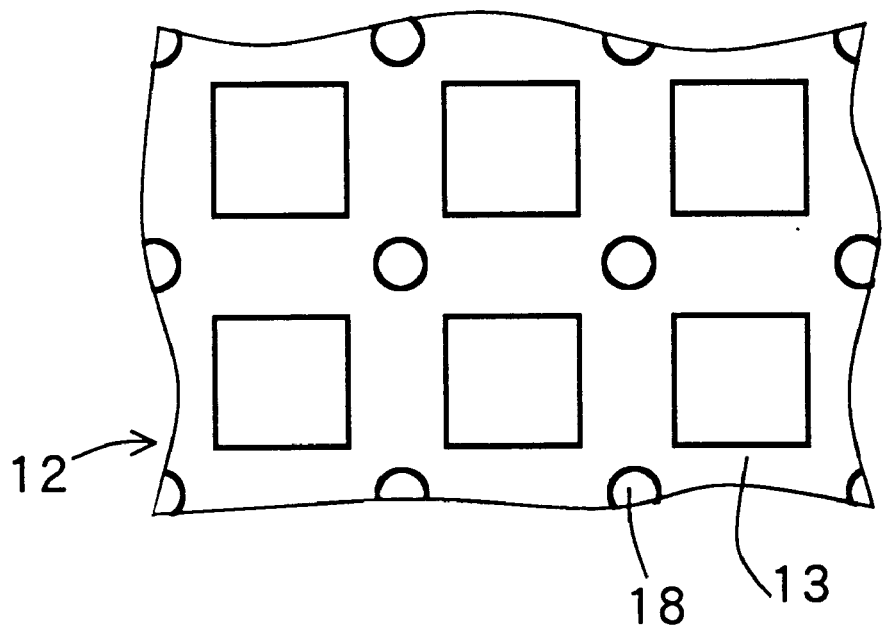
FIG. 5($a$) is an enlarged view of a part of a developer retainer in a second embodiment.
Figure 5:
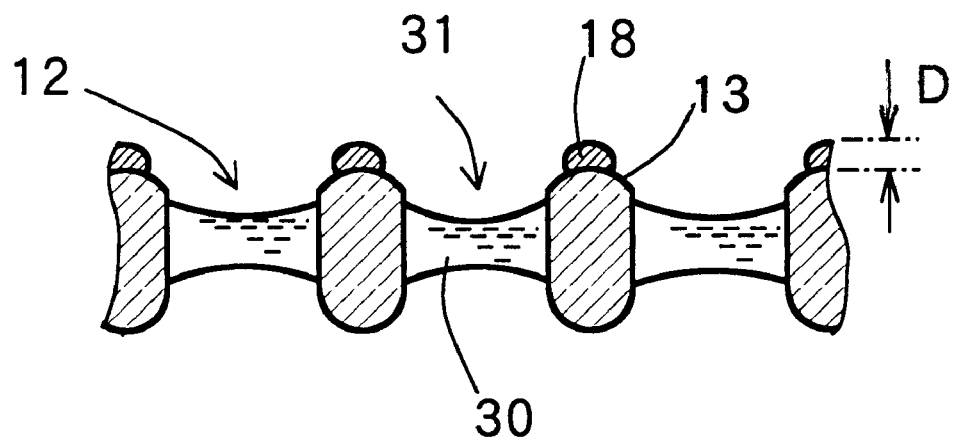

On the other hand, in the second embodiment, protrusions 18 are formed around a fine hole 12, i.e., on each intersection area of a latticed mesh constructing the retainer 3, as shown in FIGS. 5(a) and 5 (b). These protrusions 18 allow the clearance between the liquid level 31 of the liquid developer 30 and the surface 21 of a photosensitive drum 2 to be maintained at a constant distance. Specifically, assuming that the distance between the surface 13 of the retainer 3 and the top of the protrusion 18, i.e., the height of the protrusion 18 is D, the distance between the surface 20 of the drum 2 and the surface 13 of the retainer 3 is always maintained at D when the top of the protrusion 18 is brought into contact with the drum 2. Accordingly, if the level 31 of the liquid developer 30 is regulated closer to the surface 13 of the retainer 3, the distance between the level 31 and the latent image 20 is also kept constant. This provides a stable electrostatic force acting on the liquid developer. The protrusions 18 further produce an effect that the liquid developer 30 hardly adheres to the area where the image is not formed. In the case of using the retainer 3 made of a metallic mesh manufactured by electroforming as well as in the first embodiment, the protrusions 18 can be made integrally with the retainer 3 at each cross (intersection) point of the latticed mesh.

Explanation is made on the principle of the selective adhesion of liquid developer to electrostatic latent images in the case that the developer retainer 3 has the protrusions 18 as above, referring to FIGS. 6(a) through 6 (c).

The liquid developer 30 is held in each of fine holes 12 of the retainer 3 as shown in FIG. 6(a). When the drum 2 and the retainer 3 are rotated in the opposite directions to each other, the developer 30 held in the fine holes 12 gradually approaches the latent image 20 on the drum 2. When they have approached up to the closest location, as shown in FIG. 6(b), the protrusions 18 are brought into contact with the surface 21 of the drum 2.

In this closest state, the distance between the developer 30 and the latent image 20 is defined by the height of the protrusion 18 and, for example, a few $\mu$m in this embodiment. Variations in the distance are determined depending on protrusion variations generated in a manufacture process. Since the electroforming can manufacture the protrusions with high precision, however, variation between fine holes and variation with time are very small. Coming close to the charged area corresponding to the electrostatic latent image 20, the liquid developer 30 is attracted by an electrostatic force exerted thereon by the charged area. Then the developer 30 comes into contact with the surface 21 of the drum 2.

The surface 21 of the drum 2 is made of a more wettable material to the developer 30 than a material of the fine holes 12. When the surface 13 of the retainer 3 is separated from the drum surface 21, the developer 30 remains adhering to the drum 2 as shown in FIG. 6(c). On the contrary, the developer 30 close to the area carrying no charge is not influenced by the electrostatic force and does not come into contact with the drum 2 at all. Thus, the developer 30 remains retained in the fine holes 12. In this way, the protrusions 18 formed on the retainer 3 define the distance between the electrostatic latent image 20 and the developer level 31, so that the liquid developer does not come into contact with the area where the image is not formed even if the developer level 31 is not strictly regulated, thus preventing the generation of contamination and fog.

As described above, the liquid developer 30 held in the fine holes 12 selectively adheres to the drum 2 to form a visible image thereon. It is to be noted that the image forming apparatus in the second embodiment can be constructed of the same elements except the developer retainer 3 as those in the first embodiment. The operation of image forming is also the same.

As clear from the above description, the image forming apparatus in the above embodiments according to the present invention can use an aqueous liquid developer and produce steady images with high resolution.

The present invention may be embodied in other specific forms without departing from the spirit or essential characteristics thereof. For instance, instead of the aqueous liquid developer which is preferably used in view of environment, liquid developer containing an organic solvent as a main ingredient may be used.

Although a latticed metallic mesh without weave pattern is used as the developer retainer 3 in the above embodiments, a calendared mesh with weave pattern, increasing flatness thereof, may be used.

The shape of fine hole is not limited to square and may be circle, ellipse, or other shapes.

Figure 7:
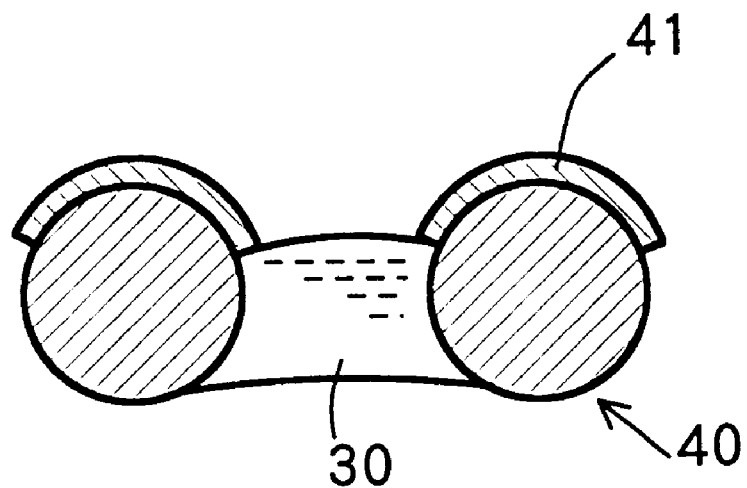
FIG. 7 is a cross sectional view of a part of a liquid developer in a second example.
Figure 8:
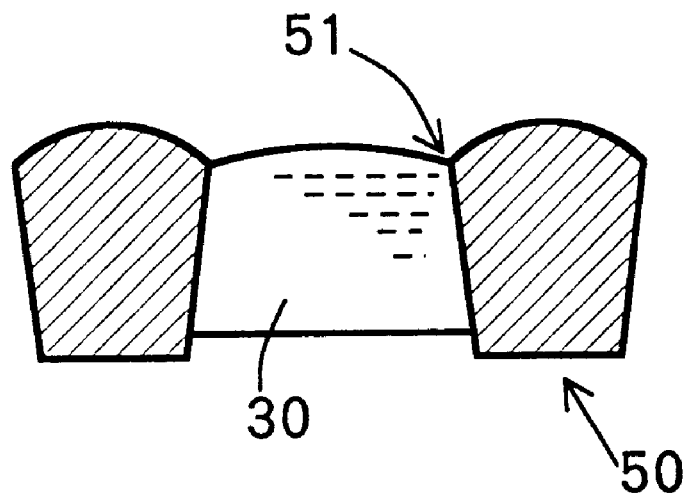
FIG. 8 is a cross sectional view of a part of a liquid developer in a third example.

Furthermore, although the remover 6 is used to regulate the level of the liquid developer 30 held in the developer retainer 3 in the above embodiment, the present invention may use other means to regulate the level of the developer 30. For example, as shown in FIG. 7, a repellent coat layer 41 may be provided on the surface of a developer retainer 40, thereby forming a part having different surface wettability from other uncoated part. The coated part being smaller in surface wettability than the uncoated part, the level of liquid developer 30 is regulated to be fixedly held. Alternatively, a developer retainer 50 may be formed to have a cross section as shown in FIG. 8. Specifically, the inner wall of the fine hole is formed at a sharp angle with the upper surface, so that a corner 51 defined between the inner wall and the upper surface causes the level of the liquid developer 30 to be fixedly held in the fine hole.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus for performing image formation including:
    a developer retainer provided with a number of fine holes each of which holds liquid developer obtained by dissolving or dispersing a coloring component in liquid;
    a developer supplier for supplying the liquid developer to the fine holes of the developer retainer;
    a photosensitive member disposed in contact with a peripheral surface of the developer retainer; and
    a latent image forming device for forming an electrostatic latent image on a surface of the photosensitive member in accordance with predetermined image data;
    the liquid developer held in the developer retainer being made to selectively adhere to the electrostatic latent image formed on the surface of the photosensitive member by the latent image forming device to form a visual image, and the visual image corresponding to the latent image being transferred to a recording medium;
    the image forming apparatus further including:
    means for regulating a level of the liquid developer held in the developer retainer;
    wherein the developer retainer, in which the level of the liquid developer is regulated by the level regulating means, holds the liquid developer in each of the fine holes alone so that a level of the liquid developer is positioned inside of the fine hole, separately from a contact point at which the surface of the retainer comes into contact with the photosensitive member by a surface tension of the liquid developer; and
    wherein the photosensitive member has a higher wettability to the liquid developer on its surface than wettability of the developer retainer surface.

2. An image forming apparatus according to claim 1, wherein the fine holes are formed to inclined holes which are shaped so that a hole diameter becomes larger as the hole is close to the surface of the developer retainer.

3. An image forming apparatus according to claim 2, wherein the inclined holes are in a horn-like or tapered shape.

4. An image forming apparatus according to claim 2, wherein the surface of the developer retainer is formed of a mesh structure.

5. An image forming apparatus according to claim 4, wherein the mesh structure is constructed of a metallic mesh provided on the surface of the developer retainer.

6. An image forming apparatus according to claim 5, wherein the metallic mesh is made of copper or nickel.

7. An image forming apparatus according to claim 6, wherein the metallic mesh is manufactured to have no weave pattern by electroforming.

8. An image forming apparatus according to claim 5, wherein the metallic mesh has a thickness of 10 $\mu$m or more.

9. An image forming apparatus according to claim 5, wherein the metallic mesh is designed to a mesh structure with a rate of opening of 20% or more.

10. An image forming apparatus according to claim 5, wherein a surface of the metallic mesh is subjected to a calendar process.

11. An image forming apparatus according to claim 5, wherein a surface of the metallic mesh is subjected to a water-repellent process.

12. An image forming apparatus according to claim 11, wherein the water-repellent process is performed by applying a plating to the surface of the metallic mesh.

13. An image forming apparatus according to claim 12, wherein the plating is a nickel fluorine plating.

14. An image forming apparatus according to claim 11, wherein the water-repellent process is performed by coating the surface of the metallic mesh with a water-repellent resin.

15. An image forming apparatus according to claim 14, wherein the water-repellent resin is a silicone resin.

16. An image forming apparatus according to claim 1, wherein the wettability of the photosensitive member is set to have a contact angle of 30°–80° with respect to the liquid developer.

17. An image forming apparatus according to claim 1, wherein the level regulating means is a removing member which removes excess liquid developer from the developer retainer by moving relative to the surface thereof.

18. An image forming apparatus according to claim 17, wherein the removing member is a doctor blade made of a silicone resin.

19. An image forming apparatus for performing image formation including:
    a developer retainer provided with a number of fine holes each of which holds liquid developer obtained by dissolving or dispersing a coloring component in liquid;

a developer supplier for supplying the liquid developer to the fine holes of the developer retainer;

a photosensitive member disposed in contact with a peripheral surface of the developer retainer; and a latent image forming device for forming an electrostatic latent image on a surface of the photosensitive member in accordance with predetermined image data;

the liquid developer held in the developer retainer being made to selectively adhere to the electrostatic latent image formed on the surface of the photosensitive member by the latent image forming device to form a visual image, and the visual image corresponding to the latent image being transferred to a recording medium;

wherein protrusions are formed around the fine holes formed in the developer retainer, and the protrusions when come into contact with the surface of the photosensitive member define a clearance between the surface of the photosensitive member and each level of the liquid developer retained in the fine holes at a constant distance.

20. An image forming apparatus according to claim 19, further including a removing member for removing excess liquid developer from the developer retainer by moving relative to the surface thereof.

21. An image forming apparatus according to claim 19, wherein the fine holes are formed to inclined holes which are shaped so that a hole diameter becomes larger as the hole is close to the surface of the developer retainer.

22. An image forming apparatus according to claim 21, wherein the inclined holes are in a horn-like or tapered shape.

23. An image forming apparatus according to claim 22, wherein the surface of the developer retainer is formed of a mesh structure.

24. An image forming apparatus according to claim 23, wherein the mesh structure is constructed of a metallic mesh provided on the surface of the developer retainer.

25. An image forming apparatus according to claim 24, wherein the metallic mesh is made of copper or nickel.

26. An image forming apparatus according to claim 25, wherein the metallic mesh is manufactured to have no weave pattern by electroforming.

27. An image forming apparatus according to claim 26, each of the protrusions is formed on an intersection area of a latticed mesh.

* * * * *